United States Patent [19]

Saito et al.

[11] Patent Number: 4,565,846

[45] Date of Patent: Jan. 21, 1986

[54] SELECTIVE GAS-PERMEABLE FILMS

[75] Inventors: Yukihiro Saito, Kawasaki; Yoshimasa Ito, Machida; Shiro Asakawa, Zama, all of Japan

[73] Assignee: Matsushita Electric Industrial Company, Limited, Osaka, Japan

[21] Appl. No.: 398,851

[22] Filed: Jul. 16, 1982

[30] Foreign Application Priority Data

Jul. 17, 1981 [JP] Japan ............................ 56-112456
Jul. 17, 1981 [JP] Japan ............................ 56-112457
Jul. 17, 1981 [JP] Japan ............................ 56-112458

[51] Int. Cl.[4] ................... C08L 83/06; C08L 83/08
[52] U.S. Cl. .................................. 525/101; 55/158; 55/186; 525/106; 525/446; 525/453; 525/474; 525/130; 525/189; 525/456
[58] Field of Search ............... 525/101, 106; 55/186, 55/158

[56] References Cited

U.S. PATENT DOCUMENTS

| | | | |
|---|---|---|---|
| 3,318,971 | 5/1967 | Chloupek et al. | 525/101 |
| 3,642,936 | 2/1972 | Hodge et al. | 525/101 |
| 3,678,126 | 7/1972 | Saam et al. | 525/106 |
| 3,767,737 | 10/1973 | Lundstrom | 264/41 |
| 3,975,455 | 8/1976 | Falender et al. | 525/106 |

Primary Examiner—Wilbert J. Briggs, Sr.
Attorney, Agent, or Firm—Lowe, King, Price & Becker

[57] ABSTRACT

A selective gas-permeable film comprising a crosslinked copolymer product of a bifunctional polyorganosiloxane and a mixture of a styrene polymer having an aromatic ring at the side chain thereof, a phenolic polymer having an aromatic ring at the main chain thereof or an addition polymer of a phenolic compound and a phenyl ether compound joined through methylene groups and a polymer having functional end hydroxyl groups. Alternatively, the copolymer product may be of the bifunctional polyorganosiloxane and the addition polymer alone.

8 Claims, No Drawings

SELECTIVE GAS-PERMEABLE FILMS

BACKGROUND OF THE INVENTION

1. Field of the Invention

This invention relates to polyorganosiloxane-base copolymers of the crosslinked type and more particularly to films obtained therefrom. The films have selective gas permeability and improved mechanical strength.

2. Description of the Prior Art

Permeable, non-porous polymer membranes have particular utility in separating gas mixtures from each other to obtain the respective enriched gas components. In particular, oxygen which occupies 21 percent by volume of the air is one of the most important materials from the industrial standpoint particularly in the fields of general combustion furnaces, the iron-making industry, the food industry, medical appliances, waste treatments and the like. Accordingly, it is desired to separate oxygen from the air in an efficient, inexpensive and easy manner.

Typical of separation of oxygen or nitrogen from the air without use of any membranes are the PSA method and the low-temperature processing. The low-temperature processing requires a great deal of energy and is not economical, and the PSA method has the disadvantage that an oxygen- or nitrogen-enriched gas cannot be obtained continuously and is thus not produced on an industrial scale.

In contrast, the separation techniques using polymer membranes can continuously provide oxygen- or nitrogen-enriched gases and are thus very advantageous industrially. Accordingly, there is a strong demand for films or membranes which exhibit high selective separability and high permeability of intended gas. A number of methods using ultrathin or thin polymer members have hitherto been reported up to now. For separating oxygen or nitrogen from the air in amounts as much as possible by the use of thin polymer films, several important factors are known including the permeation coefficient of thin polymer film membranes with respect to oxygen or nitrogen, mechanical strength of the thin film, and thin film-forming techniques. Among polymeric materials, natural rubbers, synthetic rubbers such as polybutadiene, silicone rubbers and the like are known to have relatively excellent gas permeability, among which silicone rubbers are most excellent. That is, silicone rubbers show more excellent gas permeability than all other polymeric materials with respect to almost all gases though the permeability ratio of two gases becomes small, thus being considered as a practically convenient polymeric material. Silicone rubbers or polyorganosiloxanes have such properties that the interaction between molecules is small and the flexibility of the siloxane bonds is large. This is believed to be a reason why silicone rubbers are excellent in gas permeability. In this connection, the above properties are believed to have close relation with poor mechanical strength of silicone polymers: the small interaction between molecules causes a silicone polymer to be amorphous and thus lower its mechanical strength considerably. Accordingly, silicone polymers are utilized as permeable membranes after crosslinkage by curing into silicone rubbers. Silicone rubbers, when used as general structural materials, have very excellent weatherbility and satisfactory mechanical strength as is well known in the art, but are disadvantageous in that the cured silicone product is poor in film-forming property and is difficult to form into a thin film for gas permeation.

In order to overcome the above disadvantage and improve the film-forming property, an attempt has been made to provide block copolymers of, for example, polydimethylsiloxane-polycarbonate (U.S. Pat. No. 3,767,737). These block copolymers have sufficient mechanical strength to be formed into thin films without undergoing curing treatments and are soluble in organic solvents, so that film formation is feasible by casting or other ordinary techniques, thus providing thin films readily.

However, because of the introduction of other polymers to the polydimethylsiloxane, the block copolymers have a relatively low siloxane content and the gas permeability is lowered to a level of about ⅓ times that of silicone polymer itself. From this, it is considered that if copolymers having an increasing content of siloxane and sufficient mechanical strength for film formation are obtained, gas-permeable films having improved gas permeability over the block copolymers will be formed.

SUMMARY OF THE INVENTION

It is accordingly an object of the present invention to provide novel crosslinked polyorganosiloxane-base copolymers capable of providing films having excellent selective gas permeability and mechanical strength sufficient for film formation by ordinary techniques.

It is another object of the present invention to provide selective gas-permeable films using the just-mentioned type of the copolymer products as well as compositions for providing such films.

According to the present invention, there is provided a selective gas-permeable film of a copolymer product of the crosslinked type which is substantially composed of α,ω-bifunctional polyorganosiloxane which is reacted with a mixture of a polyfunctional polymer such as a styrene polymer, a phenolic polymer or an addition polymer of a phenolic compound and a phenyl ether joined through methylene bonds and a polymer having functional end groups, both capable of reacting the polyorganosiloxane. Further, the addition polymer may be used singly for reaction with the bifunctional polyorganosiloxane as will be described in detail hereinafter. When the polyorganosiloxane is reacted with the mixture or the addition polymer in predetermined amounts, the resulting copolymer is soluble in organic solvents and has sufficient mechanical strength which is believed to be derived from the crosslinked structure of the copolymer. The crosslinked copolymer product has a siloxane content of about 50 to 90%, preferably 65 to 80%, and a coefficient of oxygen permeation as high as over ½ times that of silicone rubbers.

More specifically, there is provided a selective gas-permeable film which comprises a copolymer product of the crosslinked type of (1) an α,ω-bifunctional polyorganosiloxane of the general formula (I)

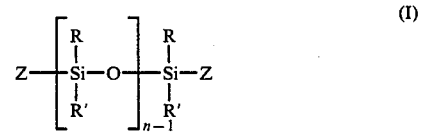

in which each Z represents a halogen atom, a hydroxyl group, an alkoxy group, an amino group, a dimethylamino group, a diethylamino group or a dipropylamino group, R and R' independently represent a hydrogen atom, a methyl group, a phenyl group, a halogenated alkyl group or a vinyl group, and n is an integer of from 5 to 200; and (2) either a mixture of a polyfunctional polymer selected from the group consisting of (a) a styrene polymer having an aromatic ring at the side chain thereof and an average molecular weight ranging from 1,000 to 30,000 and represented by recurring units of the general formula (II)

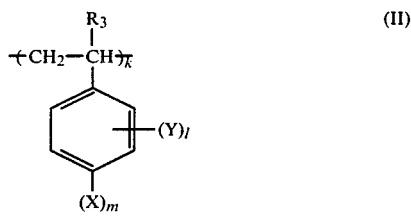

(II)

in which $R_3$ represents a hydrogen atom, an alkyl group or a halogen atom, Y represents a hydrogen atom, a halogen atom, an alkyl group, an alkoxy group or an alkyl silyl ether group, X represents a hydroxyl group, a carboxyl group, an amino group, an alkylamino group or a sulfonic acid group, l is an integer of 0 to 2 and m is an integer of from 0 to 3 provided that both l and m are not zero at the same time, and k is an integer sufficient to realize the defined range of the molecular weight, (b) a phenolic resin having an aromatic ring at the main chain thereof and a molecular weight of 300 to 1,000 and represented by recurring units of the general formula (III)

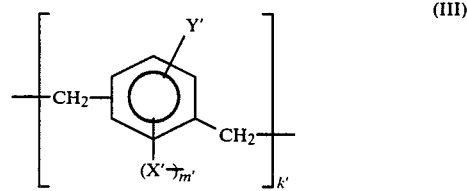

(III)

in which Y' represents a hydrogen atom, a methyl group, an ethyl group, a propyl group or a butyl group, X' represents a hydroxyl group, an amino group or a methoxy group, m' is an integer of 1 to 3, and k' is an integer sufficient to realize the defined range of the molecular weight, or (c) an addition polymer of a phenolic compound and a phenyl ether joined through methylene bonds, and (d) a functional end group-bearing polymer having a molecular weight of 1,000 to 10,000 and represented by the general formula (IV)

(IV)

in which each $R_1$ represents a dihydric phenol residue, $R_2$ represents a reactive residue capable of condensing with the phenolic hydroxyl groups to form a polyester, polyether or polyurethane, and i is an integer of 5 to 50, or (3) the an addition polymer itself of a phenolic compound and a phenyl ether joined through methylene groups, the weight ratio of the bifunctional polyorganosiloxane to the mixture or the addition polymer being in the range of 5:1 to 1:1.

DETAILED DESCRIPTION OF THE INVENTION

The α,ω-bifunctional polyorganosiloxane which is one of the starting material or the crosslinked copolymer product of the present invention is represented by the following general formula (I)

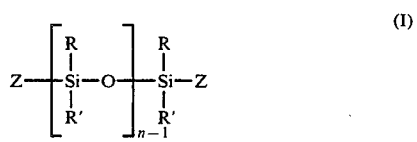

(I)

in which each Z represents a group which is reactive with a polyfunctional polymer, a functional end group-bearing polymer and an addition polymer of a phenolic compound and a phenyl ether joined through methylene bonds and which includes a halogen atom such as Cl, Br or I, a hydroxyl group, a lower alkoxy group such as methoxy or ethoxy and an amino group, a dimethylamino group, a diethylamino group and a dipropylamino group, R and R' are independently a hydrogen atom, a methyl group, a phenyl group, a halogenated alkyl group such as chloroethyl, chloropropyl, fluoroethyl or fluoropropyl and a vinyl group, and n is an integer of from 5 to 200, preferably 9 to 150. When n is an integer smaller than 5, i.e. when a bifunctional siloxane oligomer is used for reaction with polyfunctional polymer, functional end group-bearing polymer or addition polymer having a certain range of a degree of polymerization, gelled products are produced in great amounts. That is considered due to the very high density of crosslinkage occuring in the product. As the value n increases, the amount of the gelled product decreases with an increasing amount of a soluble copolymer. Accordingly, if the reaction proceeds to a certain but to a small extent, further polysiloxane units are not introduced into a final product. Accordingly, the value, n, should be within the range defined hereinabove.

Typical and preferable examples of the bifunctional polyorganosiloxane include α,ω-bis(diethylamino)-polydimethylsiloxane, α,ω-bis(diethylamino)polymethylphenylsiloxane, α,ω-bis(diethylamino)polymethylethylsiloxane, α,ω-(dichloro)polydimethylsiloxane, α,ω-(dichloro)polymethylphenylsiloxane, α,ω-(dichloro)-polymethylethylsiloxane and the like (n=5-190 in the formula I(I)), of which the first-mentioned polysiloxane is most preferable.

The polyfunctional polymers used for reaction with the bifunctional polyorganosiloxane in combination with the functional end group-bearing polymer are: styrene polymers of recurring units of the following formula (II) having an aromatic ring at the side chain thereof

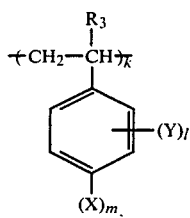 (II)

in which $R_3$ represents a hydrogen atom, a lower alkyl group such as methyl, ethyl or the like, or a halogen atom such as Cl, Br or I, Y represents a hydrogen atom, a halogen atom, a lower alkyl group having 1 to 4 carbon atoms, an alkoxy group having 1 to 18 carbon atoms, and an alkyl silyl ether group such as trimethylsilyl ether group, dimethylsilyl ether group or the like, X represents a hydroxyl group, a carboxyl group, an amino group, an alkylamino group such as methylamino or ethylamino or a sulfonic acid group, l is an integer of 0 to 2 and m is an integer of 0 to 3 provided that both l and m are not zero at the same time, and k is an integer sufficient to realize a defined range of molecular weights; phenolic resins having an aromatic ring at the main chain thereof and represented by recurring units of the general formula (III)

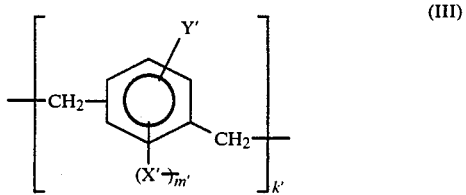 (III)

in which Y' represents a hydrogen atom, a methyl group, an ethyl group, a propyl group or a butyl group, X' represents a hydroxyl group, an amino group or a methoxy group, m' is an integer of 1 to 3, and k' is an integer similar to the case of the styrene polymer; and addition polymer products of phenolic compounds and phenyl ether compounds joined through methylene groups.

The styrene polymers useful for the purpose of the invention have generally an average molecular weight of 1,000 to 30,000. Typical examples of the styrene polymers include poly-p-hydroxystyrene, poly-3,5-dimethyl-4-hydroxystyrene, poly-p-hydroxystyrene bromide, poly-3-methoxy-4-hydroxystyrene and mixtures thereof, poly-o-hydroxystyrene, poly-p-aminostyrene, polystyrenesulfonic acid, polyvinylbenzoic acid, polyvinylsalicylic acid, poly-2,5-dihydroxystyrene, polyisopropenylphenol and the like. Moreover, the styrene polymers may be copolymerized with monomers having excellent film-forming properties such as, for example, acrylic esters. With hydroxystyrene polymers, for example, poly-p-hydroxystyrene, the polyhydroxystyrene may be etherized such as by trimethylsilylation, alkylation or the like, and is represented by the general formula (V)

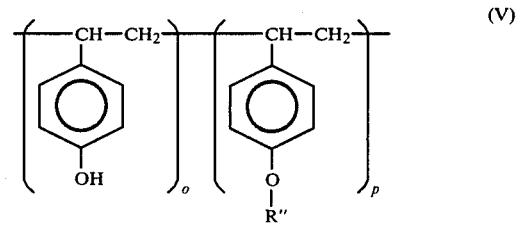 (V)

in which R" represents $Si(CH_3)_3$ or an alkyl group having 1 to 18 carbon atoms, and o+p is k of the formula (II).

The phenolic polymers useful in the present invention have a similar range of an average molecular weight of 300 to 1,000. Typical examples of the resins include novolac resins. Other phenolic resins having the defined substituents therein are likewise usable.

The addition polymer products of phenolic compounds and phenyl ether compounds joined through methylene groups are those which are obtained by addition polymerizing phenolic compounds such as phenol, cresol, 4-methoxyphenol and the like and phenyl ether compounds such as diphenyl ether and polyphenylene ether of a relatively low degree of polymerization, by the use of formaldehyde under ordinary polymerization conditions. The phenyl ethers may be substituted or unsubstituted. This type of the addition polymerization reaction is well known in the art and is not described in detail herein. The weight ratio of the phenolic compound to the phenyl ether is generally in the range of 1:0.5 to 1:5 for achieving the purpose of the invention.

On the other hand, the polymers having functional end groups used in combination with the above-described polyfunctional polymers are represented by the following general formula (IV), $HO—(R_1—R_2)_i—R_1—OH$, in which each $R_1$ represents a dihydric phenol residue, $R_2$ is a reactive residue capable of condensing with the phenolic hydroxyl groups to form a polyester, polyether or polyurethane, and i is an integer of 5 to 50. Although the functional end groups may be reactive groups other than the hydroxyl group, the hydroxyl group has been found to be very useful in the reaction with the bifunctional polyorganosiloxane. Typical examples of these polymers are polysulfones, polyurethanes and polyethers and preferable examples are particularly represented by the following formulae:

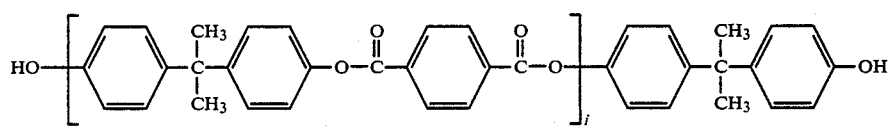

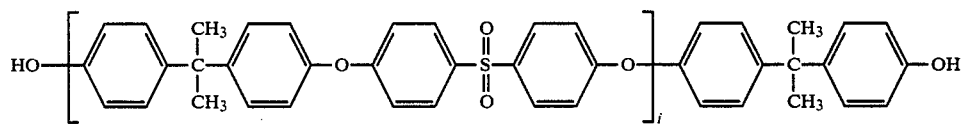

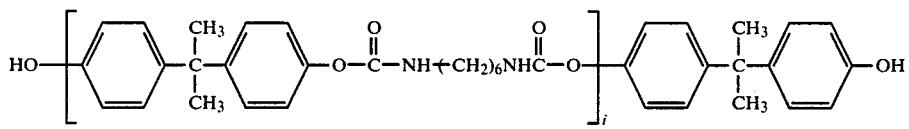

The reactivity between the bifunctional polyorganosiloxane and the mixture of the polyfunctional styrene, phenolic polymer or addition polymerization product and the polymer having functional end groups is influenced by the molecular weights of the polyfunctional polymer and the functional end group-bearing polymer. In particular, the molecular weight of the polyfunctional polymer gives a greater influence on formation of the three-dimensional structure. It has been found that the weight average molecular weight of the styrene polymer of the formula (II) is favorably in the range of 1,000 to 30,000 and the molecular weight of the phenolic polymer of the formula (III) is favorably in the range of 300 to 1,000, and thus the values (k) and (k′) of the afore-indicated general formulas should be determined to satisfy these ranges of the molecular weight, respectively. The weight average molecular weight of the addition polymerization product is also favorably in the range of 1,000 to 5,000. A suitable range of the weight average molecular weight of the functional end group-bearing polymer of the formula (IV) is in the range of 1,000 to 10,000 and the value (i) is determined to satisfy this range.

Moreover, similar results are obtained when using, instead of a mixture of the polyfunctional polymer and the polymer of the formula (IV), the addition polymer products alone of phenolic compounds and phenyl ether compounds joined through methylene groups as will be particularly shown in examples. The bifunctional polyorganosiloxane of the formula (I) and a mixture of the polyfunctional polymer of the formula (II) or (III) or the addition polymerization product and the polymer of the formula (IV) are reacted by dissolving the mixture of the polymers in an organic solvent such as dioxane or a mixture of dioxane and dichlorobenzene, heating the solution in an atmosphere of an inert gas such as $N_2$ gas while agitating, dropping the polysiloxane into the solution, and agitating the solution at a temperature of 80 to 120 for about 1 to 10 hours. After completion of the reaction, the reaction system is cooled to room temperature and filtered. The resulting filtrate is charged into a great amount of an alcohol to permit the reaction product to precipitate. This precipitate is collected and purified by any known techniques such as re-precipitation to obtain a pure interpolymer. This copolymer has a high mechanical strength and particularly a high film strength which is considered to be based on the three-dimensional, crosslinking structure but is soluble in solvents.

Too high reaction temperature and too long reaction times are undesirable since gellation may take place due to the crosslinkage proceeding excessively. In practice, the ratio by weight of the polyfunctional polymer of the formula (II) or (IV) or the addition polymerization product to the polymer of the formula (IV) is in the range of 5:1 to 1:1.

The reaction between the polyorganosiloxane of the formula (I) and the addition polymer alone proceeds substantially in the same manner as described above.

The amount of the starting mixture or addition polymer and the starting polyorganosiloxane greatly vary depending on the desired film property, the types of the starting materials and the degree of polymerization of each starting material. In order to attain the desired level of the siloxane content, the weight ratio of the bifunctional polyorganosiloxane to the mixture or addition polymer is generally in the range of 1:1 to 5:1, preferably 5:1 to 5:3. The degree of crosslinkage occurring in the final copolymer is not clearly known but the improved mechanical strength proves the occurence of the cross linkage.

The final crosslinked copolymers can be formed into thin or even ultrathin films or members by dissolving in non-aqueous inert solvents and applying the solution by any known technique such as the Langmuir method, a casting, a dipping method and the like.

The solvents used to dissolve the crosslinked copolymers are, for example, those immiscible with water including aromatic hydrocarbons such as benzene, xylene, toluene and the like, and those miscible with water including ethers such as tetrahydrofuran and dioxane.

The films or members obtained from these interpolymer products have relatively high coefficients of gas permeation including a coefficient of oxygen permeation ranging from 1.7 to $4.0 \times 10^{-8}$ cc.cm/cm$^2$.sec.cm Hg and the separation factor or coefficient ratio between oxygen and nitrogen is as high as 2.2 to 3.2. In addition, the films have high mechanical strength sufficient to withstand a pressure of about 6 atms. when the pressure is applied across the film.

The present invention is particularly described by way of examples.

EXAMPLE 1

This example illustrates use of polyhydroxystyrene ($\overline{Mw}$=about 5,000) as the styrene polymer of the afore-indicated formula (II) and a polyurethane ($\overline{Mw}$=about 4,500) of the following formula as the functional end group-bearing polymer of the afore-indicated formula (IV) and α,ω-bis(diethylamino)polydimethylsiloxane (n=about 30) as the bifunctional polyorganosiloxane.

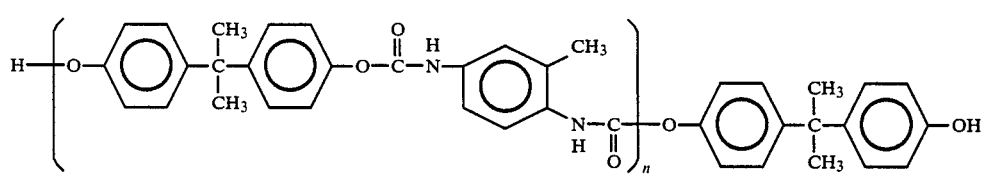

3 g of the polyhydroxystyrene and 2 g of the polyurethane were dissolved in 300 ml of 1,4-dioxane, followed by heating to 80° C. in a stream of nitrogen gas under agitation. Then, 13 g of the polydimethylsiloxane was dropped from a dropping funnel in about 30 minutes. After completion of the dropping, the reaction was carried out for about 3 hours while keeping the temperature at 80° C. Thereafter, the reaction system was cooled to room temperature and filtered. The filtrate was charged into a great amount of methanol to obtain a precipitate. The thus obtained precipitate was purified by the re-precipitation method and dried in vacuum to obtain a purified copolymer. The infrared spectroscopy of the copolymer revealed that an absorption at about 3,400 cm$^{-1}$ based on the hydroxyl groups was reduced and an absorption at about 1,100 cm$^{-1}$ based on the siloxane bonds appeared and increased. The reactive groups were hardly found to remain in the copolymer. Moreover, the distribution of molecular weight was measured by the gel permeation chromatography (GPC) with the result that a chromatogram was obtained showing a broad range of molecular weight of about 1,000,000 to 20,000. The elementary analysis and ultraviolet spectroscopy of the copolymer product revealed that the content of the diomethylsiloxane component in the product was 67%.

Then, in order to determine a gas permeation characteristic, the copolymer was dissolved in tetrahydrofuran and formed into a film by the casting technique to measure coefficients of gas permeation. This film-forming technique could provide pin hole-free films ranging from 20 microns to 400 microns in thickness and the films of different thicknesses were subjected to the measurement of the permeation but no substantial difference in the permeation coefficient was found. The coefficient of permeation was $1.78 \times 10^{-8}$ cc.cm/cm$^2$.sec.cmHg for oxygen and $7.1 \times 10^{-9}$ cc.cm/cm$^2$.sec.cmHg and thus the separation factor, a, was 2.50.

Formation of thin or ultrathin films was effected using the Langmuir method in which a perforated polypropylene film (Celgard 2400, by Celanese Fibers Co., Ltd.) was used as a support. On calculation from a flow rate of gas, the film thickness was found to be about 1500 Å and a thin film free of pin holes was readily obtained by the method. This thin film had such a high mechanical strength as to withstand a pressure when the secondary side was held at a normal pressure and the primary side was increased up to 5 atms.

EXAMPLE 2

Polyhydroxystyrene ($\overline{Mw}$=about 5,000) was used as the styrene polymer of the formula (II) and a polysulfone ($\overline{Mw}$=7,500) of the following formula was used as the polymer of the formula (IV) having functional end groups.

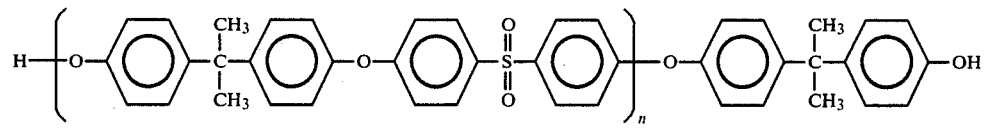

2 g of the polyhydroxystyrene and 4 g of the polysulfone were dissolved in 300 ml of a mixture of 1,4-dioxane and chlorobenzene in a mixing ratio by volume of 2:1, followed by heating to 90° C. in a stream of nitrogen gas under agitation. Then, 15 g of α,ω-bis(dimethylamino) polydimethylsiloxane was dropped in about 30 minutes into the mixture, after which the reaction was conducted for 3 hours while keeping the temperature at 80° C. After completion of the reaction, the reaction solution was cooled to room temperature and filtered. The filtrate was charged into a great amount of methanol to obtain a precipitate was purified from the re-precipitation method and dried in vacuum to obtain a purified copolymer product. The infrared spectrum and molecular weight distribution characteristics of this product were found to be similar to those of Example 1. The dimethylsiloxane content was determined in the same manner as in Example 1 and was found to be 70%. The coefficients of gas permeation measured in the same manner as in Example 1 were found to be $2.0 \times 10^{-8}$ cc.cm/cm$^2$.sec.cmHg for oxygen and $8.1 \times 10^{-9}$ cc.cm/cm$^2$.sec.cmHg for nitrogen and thus the separation factor was 2.50.

Formation of thin films was carried out using the Langmuir method using as a support a perforated polypropylene film (Celgard 2400). On calculation from a flow rate of gas, the thickness was found to be 1000 Å and thin films free of pine holes could be readily obtained. The thin films had such a mechanical strength as to withstand a pressure when the primary side was increased up to 5 atms while keeping the secondary side at a normal pressure.

EXAMPLE 3

Example 2 was repeated using instead of polyhydroxystyrene polyisopropenylphenol with the result that similar results were obtained except that the coefficient of oxygen permeation was $2.5 \times 10^{-8}$ cc.cm/cm$^2$.sec.cmHg and the separation factor was 2.5.

EXAMPLE 4

Poly-3-methoxy-4-hydroxystyrene ($\overline{Mw}$=about 5,000) was used as the styrene polymer of the formula (II) and a polyether ($\overline{Mw}$=4,000) of the formula was used as the polymer of the formula (IV) having the functional end groups.

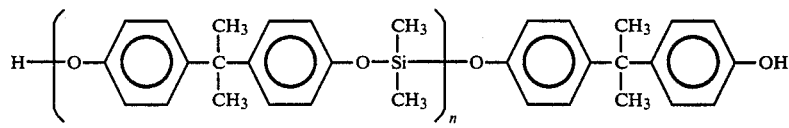

2 g of the polyhydroxystyrene and 5 g of the polyether were dissolved in 300 ml of a mixed solvent of 1,4-dioxane and chlorobenzene in a mixing ratio by volume of 2:1, followed by heating to 80° C. in a stream of N₂ gas under agitation. Thereafter, 12 g of α,ω-bis (diethylamino) polydimethyldiloxane (n=about 20) was dropped from a dropping funnel into the reaction system in about 30 minutes, after which the reaction was conducted at a temperature of 80° C. for about 3 hours. After completion of the reaction, the reaction system was cooled to room temperature and filtered. The resulting filtrate was charged into a great amount of methanol to obtain a precipitate and the precipitate was purified by the re-precipitation method and dried in vacuum to obtain a purified copolymer product. In this case, the infrared absorption spectrum and molecular weight characteristics of the product were the same as those in Example 1. As determined in the same manner as in Example 1, the dimethylsiloxane content was found to be 67%. The coefficients of gas permeation were found to be $3.0 \times 10^{-8}$ cc.cm/cm².sec.cmHg for oxygen and $1.25 \times 10^{-8}$ cc.cm/cm².sec.cmHg for nitrogen, and the separation factor was 2.4.

Thin films were also obtained in the same manner as in the foregoing examples with similar results.

EXAMPLE 5

Example 2 was repeated using brominated polyhydroxystyrene ($\overline{M}x=6,000$) having recurring units of the following formula

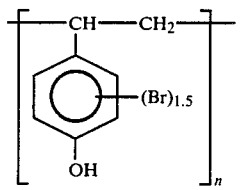

thereby obtaining an copolymer product. This product showed substantially the same infrared absorption spectrum and molecular weight distribution characteristics as those of Example 2. The coefficient of oxygen permeation was found to be $2.1 \times 10^{-8}$ cc.cm/cm².sec.cmHg and the separation factor between oxygen and nitrogen was 2.7.

This film was formed using the Langmuir method in which a perforated polypropylene film was used as a support. The thickness of the film was about 2000 Å when calculated from a flow rate of gas and thin films free of pin holes were readily obtained by this method. The film had such a method. The films had such a mechanical strength as to withstand a pressure of 5 atms.

EXAMPLE 6

Example 4 was repeated using partially trimethylsilylated polyhydroxystyrene ($\overline{M}w$=about 6000, degree of sililation=40%) having recurring units of the following formula

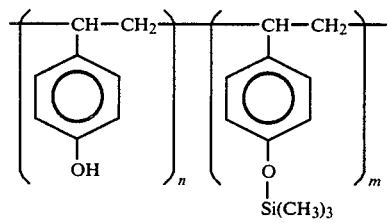

in which o and p are independently an integer and equal to K. The resulting product had substantially the same infrared absorption and molecular weight distribution characteristics as in Example 4. The coefficient of oxygen permeation was found to be $4.0 \times 10^{-8}$ cc.cm/cm².sec.cmHg and the separation factor between oxygen and nitrogen was 2.2. By the Langmuir method using a perforated polypropylene film as a support, a thin film free of pine holes was readily obtained with its thickness of about 1000 Å as calculated from a flow rate of gas.

It will be noted that in the foregoing examples, the styrene polymers of the general formula (II) in which X is hydroxyl group are used but styrene polymers having other substituents defined hereinbefore may be likewise used with similar results. This is true of the bifunctional polysiloxane.

EXAMPLE 7

A novolac resin ($\overline{M}w$=about 1,000) was used as the phenolic resin of the afore-indicated formula (III) and a polyurethane ($\overline{M}w$=about 6,000) of the following formula was used as the polymer of the formula (IV)

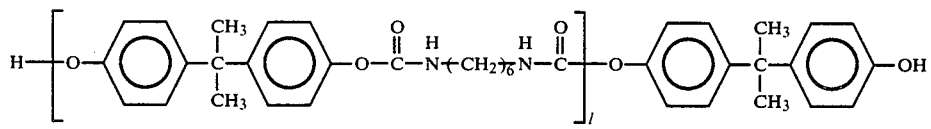

3 g of the novolac resin and 3 g of the polyurethane were dissolved in 300 ml of 1,4-dioxane, followed by heating to 80° C. in a stream of N₂ gas under agitation. Thereafter, 15 g of α,ω-bis(diethylamino) polydimethylsiloxane (n=about 15) was dropped from a dropping funnel in about 30 minutes, after which the reation was conducted at 80° C. for about 3 hours. After completion of the reaction, the reaction solution was cooled to room temperature and filtered. The resulting filtrate was charged into a great amount of methanol to obtain a precipitate. The precipitate was purified by the re-precipitation method and dried in vacuo to obtain a purified copolymer product. The infrared spectroscopy of the product revealed that an absorption at about 3,400 cm⁻¹ based on the OH groups was reduced with appearance of an absorption at about 1,100 cm⁻¹ based on the siloxane bonds. Similar to the styrene polymer case, the molecular weight distribution of the product was found to range from about 1,000,000 to 20,000 as the results of a measurement by the gel permeation chromatography.

The elementary analysis and ultraviolet spectroscopy of the product revealed that the dimethylsiloxane content was 65%. In order to determine the gas permeation characteristics of the product, it was dissolved in tetrahydrofuran and formed into a film by casting, followed by subjecting to the measurement of coefficients of gas permeation. As a result, it was found that the coefficient of oxygen permeation was $1.8 \times 10^{-8}$ cc.cm/cm$^2$.sec.cmHg and the separation factor between oxygen and nitrogen was 2.8. Thin film formation by the Langmuir provided a film free of pin holes having a thickness of about 4000 Å as calculated from a flow rate of gas.

EXAMPLE 8

A novolac resin ($\overline{M}w$=about 5,000) starting from cresol was used as the phenolic resin of the formula (III) and a polysulfone ($\overline{M}w$=about 5,500) of the following formula was used as the polymer of the general formula (IV)

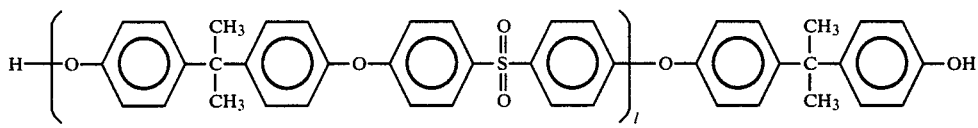

2 g of the novolac resin and 4 g of the polysulfone were dissolved in 300 ml of a mixed solvent of 1,4-dioxane and chlorobenzene, follwed by heating to 100° C. in a stream of N$_2$ gas under agitation. To the solution was added 15 g of α,ω-bis (diethylamino) polydimethylphenylsiloxane (n=about 30) was added from a dropping funnel in about 30 minutes, followed by reacting at 100° C. for 3 hours. After completion of the reaction, the reaction system was cooled to room temperature and filtered. The resulting filtrate was charged into a great amount of methanol to obtain a precipitate. The precipitate was purified by the re-precipitation method and dried to obtain a pure product. The infrared absorption spectrum and molecular weight distribution characteristics of the product were similar to those of Example 7. The siloxane content was 75% and the coefficient of oxygen permeation was $3 \times 10^{-8}$ cc.cm/cm$^2$.sec.cmHg with the separation factor of oxygen to nitrogen being 2.6. Thin film formation was conducted by the Langmuir method using a porous polypropylene film as a support. As a result, there were obtained about 1500 Å thick films free of pin holes. These thin films had such a high mechanical strength as to withstand a high pressure of 6 atms. by a test where the secondary side was held at a normal pressure and the primary side was increased up to 6 atms. In the Examples 7 and 8, the phenolic resins of the formula (III) where X is OH group were used, phenolic resins having other functional groups will be reacted with the polyorganoxiloxanes of the formula (I) by techniques known in the art.

EXAMPLE 9

8.5 parts by weight of diphenyl ether, 5.4 parts by weight of p-cresol, 3 parts by weight of paraformaldehyde and 30 parts by weight of p-toluenesulfonic acid were dissolved in 200 ml of propionic acid and heated at 85° C. for 10 hours under agitation. The resulting product was neutralized with an aqueous 5% caustic soda solution and the precipitate was separated by filtration and washed with water. The product was greenish blue in color and had a molecular weight of 2,500 to 5,000 when determined by the gel permeation chromatography. This greenish blue solid product was dissolved in tetrahydrofuran, to which was added polydimethylsiloxane having diethylamino end groups and a degree of polymerization of 19, followed by reaction at 80° C. for 8 hours. After completion of the reaction, the reaction solution was poured into a great amount of methanol to obtain a precipitate. The thus obtained precipitate was purified and dissolved in tetrahydrofuran to give a solution. The solution was used to determine molecular weight of the product by the gel permeation chromatography with the result of a molecular weight of about 45,000. The tetrahydrofuran solution was cast on a glass plate and dried to obtain a film. The film had a coefficient of oxygen permeation of $3.2 \times 10^{-8}$ cc.cm/cm$^2$.sec.cmHg and the separation factor with regard to nitrogen was 2.7.

EXAMPLE 10

5 parts by weight of poly-m-phenoxylene (degree of polymerization of about 10, made by Codak Inc.), 1.5 parts by weight of p-cresol, 0.8 parts by weight of paraformaldehyde, and 10 parts by weight of p-toluenesulfonic acid were dissolved in 100 ml of propionic acid, followed by treating in the same manner as in Example 8. The resulting polymer had a molecular weight of about 9,000 to 13,000. This polymer was reacted with the same type of polyorganosiloxane as used in Example 8 in the same manner as in Example 8 to obtain an copolymer having a molecular weight of about 82,000 to 100,000. A slight degree of gelation took place during the reaction. The copolymer was dissolved in tetrahydrofuran and the solution was used to form a film by casting and the film was subjected to the measurement of the coefficient of gas permeation with the result that the coefficient of oxygen permeation was $2.8 \times 10^{-8}$ cc.cm/cm$^2$.sec.cmHg and the separation factor between oxygen and nitrogen was 3.2.

What is claimed is:

1. A selective gas-permeable film comprising a cross-linked copolymer product of
    (1) an α,ω-bifunctional polyorganosiloxane of the general formula

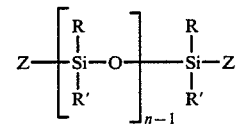

in which each Z represents a halogen atom, a hydroxy group, an alkoxy group, an amino group, a dimethylamino group, a diethylamino group or a dipropylamino group, R and R' independently represent a hydrogen atom, a methyl group, a phenyl group, a halogenated alkyl group or a vinyl group, and n is an integer from 5 to 200; with a mixture of:
    (2) a styrene polymer having an aromatic ring at each side chain thereof and an average molecular weight ranging from 1,000 to 30,000 and selected from the group consisting of poly-p-hydroxystyrene, poly-3,5-dimethyl-4-hydroxy-styrene, poly-p-hydroxystyrene bromide, poly-3-methoxy-4-hydroxystyrene and mixtures thereof, poly-o-hydroxystyrene, poly-p-aminostyrene, polystyrenesulfonic acid, polyvinylbenzoic acid, polyvinylsalicylic acid, poly-2,5-dihydroxystyrene, polyisopropenylphenol, copolymers of the styrene polymers with acrylic esters, etherized derivatives of polyhydroxystyrene which have recurring units of the formula

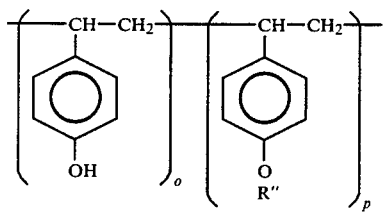

in which R" represents Si(CH$_3$)$_3$ or an alkyl group having 1 to 18 carbon atoms, and o and p are integers sufficient to define the molecular weight range; and (3) a functional end group-bearing polymer having an average molecular weight of from 1,000 to 10,000 and represented by the general formula

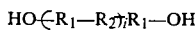

in which each R$_1$ represents a dihydric phenol residue, R$_2$ represents a reactive residue capable of condensing with the phenolic hydroxyl groups to form polyester, polyether or polyurethane, and i is an integer from 5 to 50.

2. A selective gas-permeable film according to claim 1, wherein said styrene polymer is a hydroxystyrene polymer.

3. A selective gas-permeable film according to claim 2, wherein said styrene polymer is a hydroxystyrene polymer which has been etherized to have recurring units of the formula

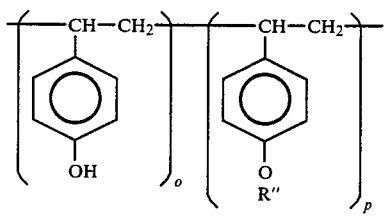

in which R" represents Si (CH$_3$)$_3$ or an alkyl group having 1 to 18 carbon atoms, and o and p are integers sufficient to define the molecular weight range.

4. A selective gas-permeable film according to claim 1, wherein said bifunctional polyorganosiloxane is α,ω-bis (diethylamino)polydimethylsiloxane.

5. A selective gas-permeable film according to claim 1, wherein said copolymer product has a siloxane content of 65 to 80%.

6. A selective gas-permeable film according to claim 1, wherein n in the formula is in the range of from 9 to 150.

7. A selective gas-permeable film according to claim 1, wherein said film is an ultrathin film deposited on a support.

8. A crosslinked copolymer product of
(1) an α,ω-bifunctional polyorganosiloxane of the general formula

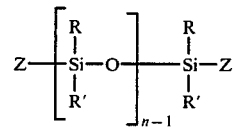

in which each Z represents a halogen atom, a hydroxy group, an alkoxy group, an amino group, a dimethylamino group, a diethylamino group or a dipropylamino group, R and R' independently represent a hydrogen atom, a methyl group, a phenyl group, a halogenated alkyl group or a vinyl group, and n is an integer from 5 to 200; with a mixture of:

(2) a styrene polymer having an aromatic ring at each side chain thereof and an average molecular weight ranging from 1,000 to 30,000 and selected from the group consisting of poly-p-hydroxystyrene, poly-3,5-dimethyl-4-hydroxy-styrene, poly-p-hydroxystyrene bromide, poly-3-methoxy-4-hydroxystyrene and mixtures thereof, poly-o-hydroxystyrene, poly-p-aminostyrene, polystyrenesulfonic acid, polyvinylbenzoic acid, polyvinylsalicyclic acid, poly-2,5-dihydroxystyrene, polyisopropenylphenol, copolymers of the styrene polymers with acrylic esters, etherized derivatives of polyhydroxystyrene which have recurring units of the formula

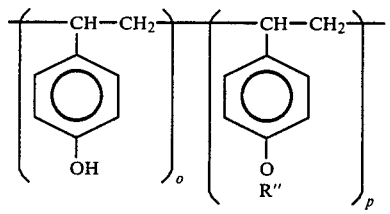

in which R" represents Si(CH$_3$)$_3$ or an alkyl group having 1 to 18 carbon atoms, and o and p are integers sufficient to define the molecular weight range; and (3) a functional end group-bearing polymer having an average molecular weight of from 1,000 to 10,000 and represented by the general formula

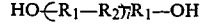

in which each R$_1$ represents a dihydric phenol residue, R$_2$ represents a reactive residue capable of condensing with the phenolic hydroxyl groups to form polyester, polyether or polyurethane, and i is an integer from 5 to 50.

* * * * *